April 4, 1933.  E. WILDHABER  1,903,318
WORM GEARING
Filed Sept. 3, 1931   2 Sheets-Sheet 1
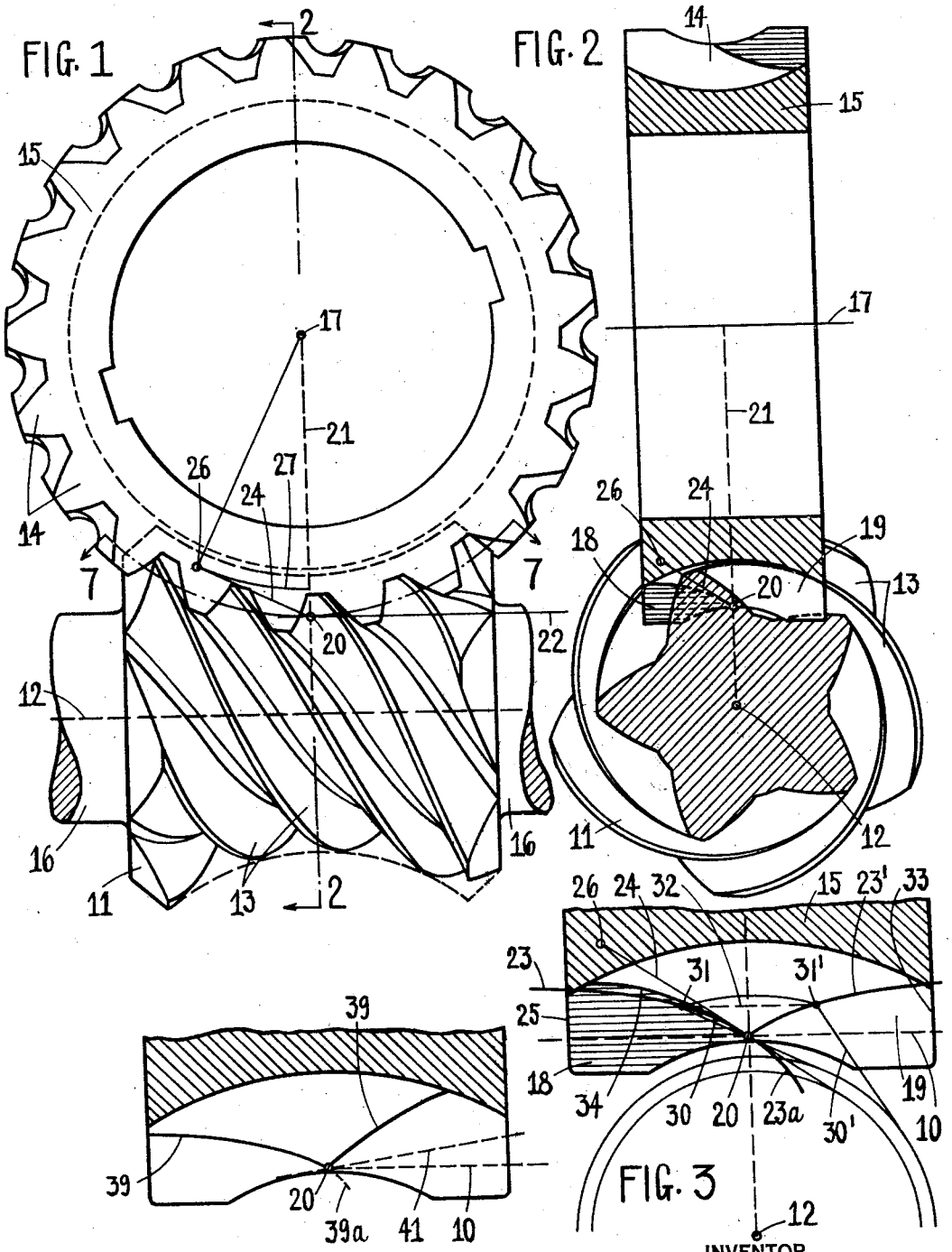

April 4, 1933.  E. WILDHABER  1,903,318
WORM GEARING
Filed Sept. 3, 1931  2 Sheets-Sheet 2

INVENTOR
Ernest Wildhaber

Patented Apr. 4, 1933

1,903,318

UNITED STATES PATENT OFFICE

ERNEST WILDHABER, OF BROOKLYN, NEW YORK

WORM GEARING

Application filed September 3, 1931. Serial No. 560,904.

The present invention relates to the tooth form of worm gearing, comprising a worm and a worm wheel or segment conjugate to it, and particularly to the type of worm gearing containing a nonhelical worm.

One object of the present invention is to provide an improved tooth form, which contains increased load capacity and which insures long wear. A related object is to devise worm gearing which contains very intimate tooth contact, and to devise the worm gearing having a long duration of contact. A further object is to devise worm gearing of high efficiency and very small friction loss, obtained by providing a tooth shape which favors efficient lubrication.

The invention is applicable to power transmission units and to any other uses of worm gearing, for instance also to steering gears. The term worm wheel or wheel is here used throughout in its broad meaning, including whole wheels as well as partial wheels or segments.

A further object in view is to devise worm gearing whose mesh approaches surface contact to the utmost limit, and yet is free from tooth interference. A still other object is to devise an accurate, well defined and practical solution for high capacity worm gearing, which can be accurately produced, and to devise a procedure whereby interference may be avoided and whereby maximum intimacy of tooth contact may be retained.

In the accompanying drawings

Fig. 1 is a view of one form of worm gearing constructed in accordance with the present invention, the view being taken lengthwise of the axis of the worm wheel.

Fig. 2 is a section taken along lines 2—2 of Fig. 1.

Fig. 3 is a partial enlargement of Fig. 2 and a diagram further explanatory of the present invention.

Fig. 9 is a partial axial section of a worm wheel or segment and a peripheral view of a wheel tooth, illustrative of the line of tooth contact between the wheel tooth and the worm. The showing of Fig. 9 corresponds to the embodiment referred to in Fig. 3.

Figure 4:
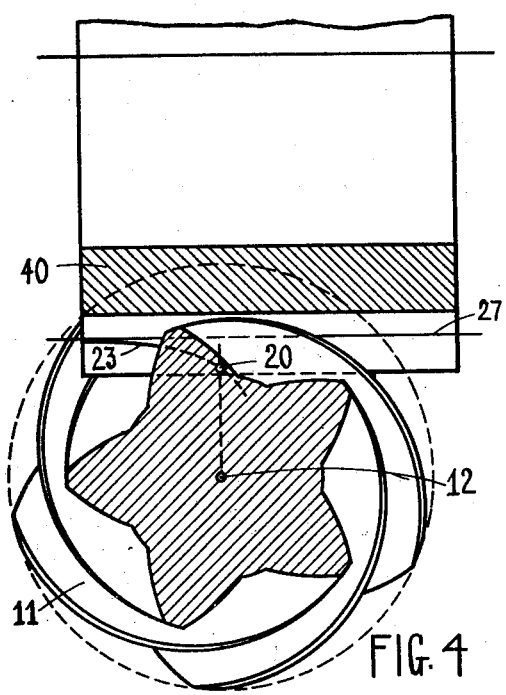
Fig. 4 is a sectional view and diagram showing the worm also indicated in Fig. 2 in engagement with a helical abrading member. The sectional plane passes through the axis of said abrading member and is perpendicular to the axis of the worm.

In Fig. 1, Fig. 2 and Fig. 3, numeral 11 denotes a worm having an axis 12 and containing teeth or threads 13, which are suited to mesh with the teeth 14 of worm wheel 15. The worm illustrated is formed integral with its shaft 16, of which only portions are shown. Worm 11 and wheel 15 are journalled in known manner in suitable bearings, which are omitted in the drawings.

In contradistinction to a known form of worm, which has a constant axial pitch and equal thread profiles in all sections perpendicular to the worm axis, worm 11 is a nonhelical worm: Its thread profiles change lengthwise of its axis. The worm is preferably of hour glass form, as illustrated in the drawings.

Worm 11 of the embodiment now referred to can be very simply defined: It is a worm fully conjugate to a helical gear coaxial with worm wheel 15, so that it may mesh with line contact with such helical gear. A portion of this helical gear is actually incorporated on worm wheel 15, as will be further described.

I have discovered that the same elements of the worm thread, which engage the helical tooth portions of the worm wheel are capable of contacting further with the worm wheel, if the latter contains a surface fit for such contact.

In other words, if the worm were capable to mould the wheel, it would form on the wheel teeth a helical portion 18, pointed out in Fig. 2 and Fig. 3 with horizontal shading lines, and another portion 19 which corresponds to said other contact of the worm threads.

It will be demonstrated hereafter that said other contact is much more intimate and therefore more valuable. In consequence the gearing is preferably so designed that the tooth portions furnishing said other contact occupy the larger part of the gear teeth, and the helical portions occupy the smaller part. This can be conveniently accomplished by disposing the tooth surfaces of the wheel largely inside of the pitch point 20. The latter then appears near the tip of the wheel teeth, see Fig. 2. The pitch point is here understood to be the point of central line 21, at which the tooth angle or lead angle of the worm threads matches the inclination angle of the wheel teeth. Central line 21 is perpendicular to both axes 12 and 17, and is the shortest connection line between said axes, as commonly known.

Pitch point 20 can also be defined as the intersection point of the surface of action with central line 21.

The location of the pitch point on line 21 may be determined in conventional manner.

Likewise the determination of the mesh and the surface of action between a helical surface and a surface conjugate to it is known. It is therefore sufficient to point out that a line of contact between a helical surface 18 and the worm thread may be determined as the normal projection of a line 22 (Fig. 1) to the helical tooth surface. Line 22 passes through pitch point 20, and is perpendicular to the direction of the wheel axis 17. When the axes 12 and 17 are disposed at right angles to each other, as usual, line 22 is furthermore parallel to the worm axis 12. In the Figures 2 and 3 it appears to coincide with pitch point 20. The surface of action is composed of the various lines of tooth contact, which correspond to different turning positions of said helical surface (18) and of the worm.

Preferably surface 18 is made an involute helical surface, that is to say a surface of the character of the tooth sides of conventional helical gears.

The surface of action so determined intersects a plane perpendicular to the worm axis and containing the wheel axis in a line 23, see Fig. 3, whose drawing plane coincides with said plane. Line 23 passes through pitch point 20 and extends in the general direction of the projected tooth normal 24 at pitch point 20, towards the axis (17) of the worm wheel and towards the tooth ends 25 of lower pressure angle.

In worm gearing of the character referred to one may distinguish between a tooth end of lower pressure angle and a tooth end of higher pressure angle. The tooth end of lower pressure angle is on the side on which mean tooth normal 24 of the considered tooth side comes closest to the axis 17 of the worm wheel.

The characteristics of involute helical surface 18 are determined from the position of its normal 24. Its base radius is the distance between wheel axis 17 and point 26 (see Fig. 1), at which normal 24 comes closest to axis 17. A portion of the base circle is indicated at 27.

In Fig. 3, numeral 30 denotes a tooth normal and line of action between the helical surface 18 and the worm threads. Normal 30 intersects line 23 in a point 31. In the shown position of normal 30, a force extending along said normal exerts a turning moment on the worm wheel, which depends on the distance of point 31 from wheel axis 17, and on the inclination of normal 30 with respect to the drawing plane of Fig. 3.

Normal 30 is a joint normal of the worm wheel and of the worm. When it is turned about the worm axis, it gets at one time into a position 30', in which its intersection point 31' with the drawing plane has the same distance from the axis 17, (Fig. 2) of the worm wheel as point 31. In other words point 31' is located on a line 32, which is drawn through point 31 parallel to the wheel axis. Inasmuch as the inclination of the tooth normal (30') with respect to the drawing plane is unaffected through turning the normal about the worm axis, the turning moment exerted upon the worm wheel by a given force extending along the tooth normal is the same, when the normal is in position 30' as it is in position 30. This is known to be the condition of correct tooth contact, in a manner that uniform motion is transmitted. It is therefore understood, that the worm may make tooth contact along the considered normal not only in its position 30, but in its position 30' as well. This may be actually accomplished, when the worm wheel is provided with composite tooth surfaces, such as may be enveloped by the worm threads 13. This composite tooth surface consists of the aforesaid helical portion 18, and a nonhelical portion 19 already referred to, and which corresponds to a surface of action characterized by line 23'. The latter is the locus of the points 31' of all normals 30'. From the foregoing it is seen that line 23' is symmetrical to line 23, the shortest connecting line 21 of the axes 12 and 17 being the axis of symmetry. Lines 23 and 23′ form a pocket of V-shape, whose open side faces towards the axis of the worm wheel.

Those skilled in mathematics will readily realize that tooth engagement between the worm and its wheel must be very intimate, especially at points whose tooth normals intersect line 23′ close to the pitch point 20. A double tooth engagement at points near each other, as experienced at points adjacent the pitch point, results of necessity in an intimate tooth engagement: Any line of the worm thread, such as a line projected as 32, Fig. 3, has two tangents in common with the worm wheel, namely the tangents at the two contact points, and therefore nearly fits the tooth surface of the worm wheel in a region adjacent said points. In the limit case, when line 32 is assumed infinitely close to pitch point 20, the two contact points coincide, or in mathematical language, they can be considered as infinitely close to each other. This is the limit case of an excellent fit, which approaches surface contact. Disregarding now the portion 18 of the tooth surfaces, let us focus attention to the portion 19, which furnishes the intimate tooth contact. It corresponds to a surface of action characterized by line 23′, which extends from the pitch point towards the wheel axis and towards the tooth ends 33 of larger pressure angle.

I have discovered that surfaces (19) corresponding to a line 23′ inclined to the direction of the wheel axis of necessity should terminate at pitch point 20, or broadly adjacent pitch point 20, to avoid interference and to avoid loss of all the advantages inherent to such tooth shape. Accordingly surface 19 is made to end at the pitch point 20, and the two surfaces 18, 19 join each other along a line 34, which passes through the pitch point. Inasmuch as the two surfaces have a joint line of action at the pitch point, which in the present case of involute helical surfaces 18 is identical with the tooth normal 24 at the pitch point, the two surfaces 18, 19 join each other smoothly, without corners. Abrupt changes are confined to the curvature. The lines which extend across line 34 on the tooth surface of the worm wheel have an abrupt change of their curvature centers at the points of said line 34.

In contradistinction to line 23′, line 23 may continue through the pitch point and form an addition 23a to the V-shape 23, 23′.

Figures 7, 8:
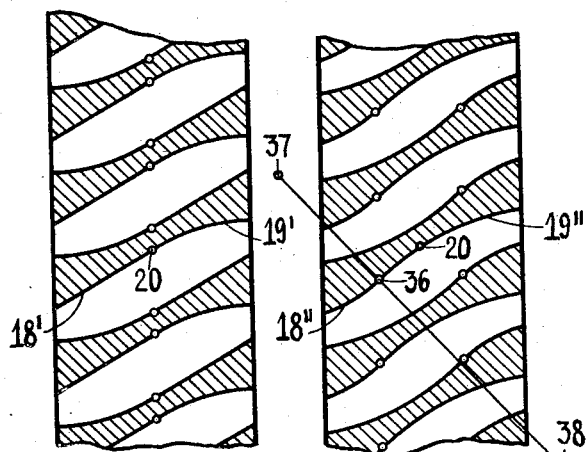
Fig. 7 is a development to a plane of a cylindrical section concentric with the worm wheel, along lines 7—7 of Fig. 1, and passing through the pitch point (20).
Fig. 8 is a development similar to Fig. 7 and illustrative of a modified form of tooth.

A cylindrical section taken through pitch point 20, Fig. 2, is indicated in development in Fig. 7. The tooth lines are seen to consist of a straight portion 18′, which corresponds to the involute helical surface 18, and of a concave portion 19′, which corresponds to the surface 19. Portion 18′ is entirely straight up to pitch point 20, where the curvature abruptly changes into the concave curvature of portion 19′.

In the modification of the present invention shown in Fig. 8, the portion 18″ is a convex curve which corresponds to nonhelical surface, and portion 19″ is a concave curve, which meets portion 18″ at point 36. The two portions have different curvature centers 37, 38 at the meeting point 36, at which the curvature of the tooth line abruptly changes from convex to concave. Fig. 8 also illustrates the case, where the two curves 18″, 19″ meet at a point beyond the pitch point, and where the pitch point 20 is disposed well inside of the concave portion 19″. This case will be further referred to hereafter.

The line of tooth contact on a wheel tooth is illustrated in Fig. 9, which corresponds to Fig. 3. Fig. 9 shows a gear tooth in a position where its surface just passes through the pitch point 20. The line of contact 39 is a composite line of pocket form, and particularly of V-form, which results from the aforesaid composite surface of action. In the preferred instance where the wheel teeth are derived from involute helical surfaces or involute helical hobs, the line of contact 39 is simply the normal projection to the tooth surface of the branches 23, 23′ (Fig. 3) of the surface of action.

It is noted that the pocket formed by the line of contact 39 has its open side facing towards the wheel axis, whose position is evident from Fig. 2. An addition 39a to said V-form may be made through the continued tooth contact of the helical surface 18.

For comparison Fig. 9 also shows a line 10, drawn through the pitch point 20 parallel to the wheel axis. The normal projection of line 10 to the tooth surface is a line, whose tangent at pitch point 20 is indicated in dotted lines 41. It should be noted that branch 23′ includes a larger angle with line 10 than tangent 41; and that branch 23′ is inclined to the projection of line 10 to the tooth surface.

There are several ways of forming worm gearing in accordance with the discussed embodiment of the present invention.

As explained above the threads 13 of worm 11 are conjugate to a helical gear. A generation of a thread conjugate to a helical gear is described on page 2, lines 100 to 113, of my Patent 1,653,686 entitled "Method of cutting gear teeth". In the aforesaid patent a thread is formed on a tool blank, whereas here the same kind of thread is formed on a worm blank. A tool is made which represents the helical gear. This tool is mounted adjacent a blank in the same relation as the helical gear with respect to the worm. The tool and blank are geared up at the ratio of the worm and helical gear and are rotated on their axes. At the same time feeding motion is provided between the blank and said tool, in the direction of the axis of said tool and angularly about said axis, so that the cutting edges describe the entire tooth surfaces of the helical gear which the tool represents.

Another way of forming a worm conjugate to a helical gear is described in my Patent No. 1,797,461, entitled "Method of forming gears".

One convenient way of finishing worms after hardening is by abrading with a member containing helical teeth, and representing the helical tooth surfaces of the worm wheel. This is diagrammatically indicated in Fig. 4. Said member may be embodied as a wide face lapping member 40 of comparatively soft metal, such as for instance of cast iron. Mesh between the helical tooth sides of said lapping member and the worm 11 takes place along a surface of action which intersects the drawing plane (Fig. 3) in a line 23.

In operation the lapping member 40 and the worm 11 are rotated in engagement with each other, on axes positioned like the axes of the wheel and worm. The lapping member is furthermore made to perform a helical reciprocation lengthwise of its axis, so that its tooth surfaces engage the worm successively on their entire length. The helical lapping member may be kept true in any suitable manner.

Worm wheel 15 may be formed by first making a hob corresponding exactly to the aforesaid worm (11), and by then cutting the wheel, namely by rotating said hob and the wheel blank at the ratio of the worm and wheel and by approaching said hob and wheel blank so that they finally have the exact relative position of the worm and wheel. The hob then forms the described composite tooth surfaces on the worm wheel.

Another way of forming worm wheel 15 is by cutting its tooth portions 19 in accordance with the aforesaid Patent 1,797,461, and by forming surfaces 18 separately, in a different cutting operation.

Figure 11:
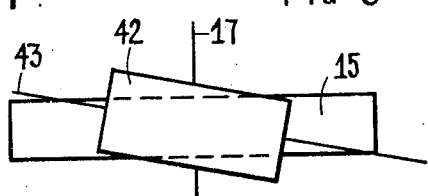
Fig. 11 is a diagram illustrative of one way of producing worm wheels constructed in accordance with the present invention.

A still other way will now be outlined with reference to Fig. 11, where numeral 42 denotes a helical hob, rotatable on an axis 43, and engaging a worm wheel 15. Axis 43 of the hob is set at an angle to a plane perpendicular to axis 17 of the worm wheel. The hob 42 may be so selected, in accordance with the disclosure of above said Patent No. 1,797,-461, that the non-helical portion 19, (Fig. 3) of the gear teeth is formed by hob 42 in its position of closest approach with respect to the axis of the wheel blank. The nonhelical surfaces of both sides of the wheel teeth may be simultaneously formed, or if so desired they may be formed with different hob settings. Preferably the helical portion 18, (Fig. 3) of one side of the wheel teeth is formed while the hob 42 and the wheel blank 15 are approached to each other. The approach may take place for instance in radial direction, that is to say in a direction perpendicular to the plane of the drawing, Fig. 11.

It is known that an involute helical thread surface may be kept in contact with a helical surface (such as portion 18) of wheel blank 15 at various distances of the axes of said surfaces, simply by additionally turning either the thread surface or the wheel blank. The relation between the thread of an approaching hob 42 and the helical surfaces of wheel 15 is similar to the relation between a rack and said wheel: Contact can be maintained continuously, when an additional motion is provided in direct proportion to the linear advance of the hob relatively to the wheel blank. So either the hob or the wheel is given an additional turning motion in direct proportion to the linear feed. The numerical amounts may be computed with the known means of the art.

Through such motion the helical portions (18) of one side of the wheel teeth may be completely generated. The two sides of the wheel teeth may be formed with two hobs, or if so desired with one hob which generates the helical portions of one side of the teeth during the approach, and the helical portions of the other side during the recess or withdrawal, whereas it forms the portions 19 of both tooth sides in the position of closest approach.

For further information regarding this way of forming worm gears, reference may be had to my companion application entitled "Worm gearing", filed September 3, 1931, Serial No. 560,905.

Sometimes it is not desired to provide helical portions 18, but other portions which are free from concave curvature, and which are entirely convex. Such portions may be generated during the approach of a hob by providing an additional turning motion in a changing proportion with respect to the linear feed, the said proportion being the same as for forming helical surfaces only immediately adjacent the position of closest approach of the hob.

Figure 5:
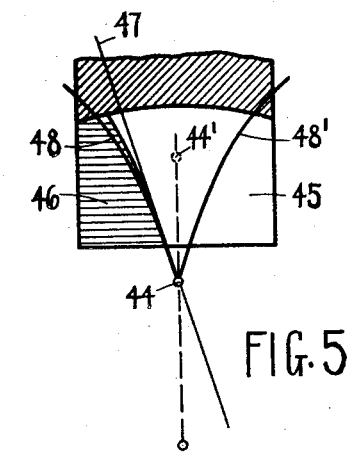
Fig. 5 is a partial axial section of a worm wheel and a diagram illustrative of a modified embodiment of the present invention, such as might be used when the worm contains a single thread or a small number of threads.

In the embodiment of the present invention indicated in Fig. 5, the pitch point 44 is disposed outside of the gear teeth. Such disposition increases the concave portion 45 as compared with the helical portion 46, as usually desired. However I do not wish to restrict myself to the shown disposition of the pitch point, which might also be placed for instance at point 44'.

The large inclination of projected tooth normal 47 is here due largely to the provision of a comparatively small lead angle of the worm, such as usually results when the worm contains only one or only a few threads. The branches 48, 48' are the intersection lines of the mathematical surface of action with a plane perpendicular to the worm axis and containing the wheel axis.

The term of mathematical surface of action includes the area of the actual tooth action and the elongation of said area. It depends on the nature of the tooth surfaces but not on their height and width.

Figure 6:
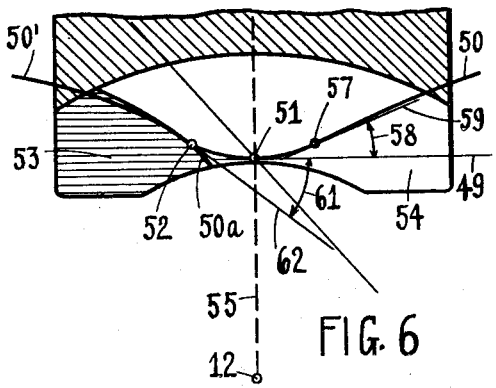
Fig. 6 is a partial axial section of a worm wheel and a diagram illustrative of a still other embodiment of the present invention.
Figure 10:
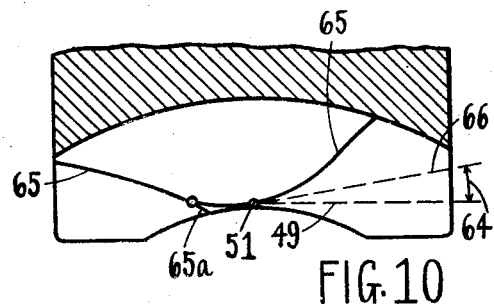
Fig. 10 is a section and view similar to Fig. 9 and referring to the embodiment described with reference to Fig. 6.

Another important embodiment of the present invention is indicated in Fig. 6 and Fig. 10. Fig. 1 can also be considered as corresponding to this embodiment.

The tooth form may again be characterized through the surface of action, which here intersects a plane perpendicular to the worm axis and containing the wheel axis in a line 50. The pocket formed by line 50 lacks the sharp corner at the pitch point. It continues without break through the pitch point 51 and has the general appearance of a wide open U. Adjacent the pitch point 51, line 50 extends parallel to the wheel axis. In other words the tangent 49 to line 50 at pitch point 51 is parallel to the wheel axis. The two branches of line 50 intersect in a point 52. The tooth portion 53 which corresponds to branch 50' of line 50 may again be made an involute helical surface, or any other surface free from concave curvature. Branch 50' may continue beyond the point 52, see portion 50a.

The worm of the worm gearing characterized by Fig. 6 may be made for instance in accordance with the disclosure of the above mentioned Patent 1,797,461, with a hob or lapping member containing a helical thread or threads, preferably one or more involute helical threads. Or also it may be formed with a milling cutter or grinding wheel of preferably conical form, whereby the milling cutter or grinding wheel is fed along its own axis, in a direction at an angle to the direction of the axis of the worm blank, as described in said disclosure.

In said disclosure it has been shown at length how a worm conjugate to a helical worm wheel may be formed with a hob or with a milling cutter. In the present instance, the diameter of said hob or milling cutter may first be computed as if the worm wheel contained helical teeth. To produce a worm corresponding to the worm gearing described with reference to Fig. 6, a hob or milling cutter of larger diameter is used than so computed.

One way of forming a worm wheel conjugate to said worm is by making a hob exactly representing the worm and by hobbing the wheel, while feeding the hob relatively to the wheel to the final position which corresponds to the worm.

Another way of cutting the worm wheel is by forming the portions 54 of the wheel teeth by a hob in the position of closest approach with respect to a wheel blank, and by forming the (involute) helical surface 53 during the approach, as described with reference to diagram Fig. 11.

In all cases where the wheel is produced by a method not directly imitating the action of the very worm with which it is intended to mesh, the two surfaces 53 and 54 or also 18, 19, (Fig. 3) are produced in different ways:

They may be produced with the same hob or tool in different positions of said hob or tool, or they may be produced with different tools. This difference in the production is a further direct indication that the tooth sides of the wheel contain composite surfaces, namely surfaces made up of two different surfaces in the instances illustrated.

In principle, line 50, 50', Fig. 6, or line 48, 48', Fig. 5, or line 23, 23', Fig. 3, can be assumed as any suitable curve which is symmetrical or nearly symmetrical with respect to the shortest connection line 55, (Fig. 6) of the axes of the worm gearing.

Often it is unnecessary to provide tooth contact on the smaller branch 50' of line 50, especially when the face of the wheel is narrow. Surface 53 then may be made any surface which stands back from the surface which corresponds to branch 50'.

Certain limitations however must be observed in all cases, to insure correct tooth action and to avoid tooth interference. I have discovered that this object is attainable when the inclination of line 23' (Fig. 3) or of the similar branch of line 50, Fig. 6, is within a limit inclination predetermined for each point of said lines. Take for instance any point 57, Fig. 6. The inclination 58 of the tangent 59 with respect to line 49, which is parallel to the wheel axis, should not exceed the inclination 61 of projected normal 62 at the point (52) of symmetry corresponding to point 57. In other words, said point (52) is disposed at the same distance from the wheel axis as point 57, and has the same distance from line 55 as point 57. The normal at said point (52) has the same distance from the worm axis as the normal at point 57, and its direction can therefore be readily computed.

In Fig. 10 I have illustrated a line of tooth contact in the position of a gear tooth, where its considered surface just passes the pitch point. Fig. 10 corresponds to the showing of Fig. 6. The line of contact 65 is seen to be a line of pocket form, whose open side faces towards the wheel axis, and whose inclination 64 at pitch point 51 is equal to the inclination of the projection 66 to the tooth surface of a line 49 parallel to the wheel axis. Line 65 may have an addition 65a, which corresponds to addition 50a of line 50, Fig. 6.

The present invention is of course applicable to right hand worm gearing and left hand worm gearing alike.

Also it should be clearly understood, that the described composite tooth surfaces may be provided on the worm, or smaller worm gear of a worm gear pair, if so desired. In this case the composite tooth surfaces of the worm may mesh with single tooth surfaces of the worm wheel. A worm so constructed may also be made of hour glass form, and may be provided with a helical component surface and another component surface extending outside of the continuation of said helical surface.

Numerous other changes and modifications may be made in my invention by simply applying current practice and established knowledge of the art, and without departing from its spirit. For definition of the scope of the invention it is relied on the appended claims.

What I claim is:

1. Worm gearing, comprising two conjugate worm gears at least one of which has composite tooth surfaces, one component of said tooth surfaces corresponding to a mathematical surface of action which intersects a plane containing the axis of rotation and perpendicular to the axis of the mating worm gear in a curve, said curve extending from the pitch point in a general direction inwardly towards the axis of rotation and sidewise towards the tooth ends of larger pressure angle.

2. Worm gearing, comprising two conjugate worm gears at least one of which has composite tooth surfaces, one component of said tooth surfaces corresponding to a mathematical surface of action which intersects a plane containing the axis of rotation and perpendicular to the axis of the mating worm gear in a curve, said curve extending from the pitch point in a general direction inwardly towards the axis of rotation and sidewise towards the tooth end of larger pressure angle, the tangent to said curve at the pitch point being inclined to the direction of the axis of rotation.

3. Worm gearing, comprising two conjugate worm gears at least one of which has composite tooth surfaces, one component of said tooth surfaces corresponding to a mathematical surface of action which intersects a plane containing the axis of rotation and perpendicular to the axis of the mating worm gear in a curve, said curve extending through said pitch point in a general direction inwardly towards the axis of rotation and sidewise towards the tooth end of larger pressure angle, the tangent to said curve at the pitch point being parallel to the axis of rotation.

4. Worm gearing comprising two worm gears conjugate to each other, at least one of said worm gears containing composite tooth surfaces conjugate to the tooth surfaces of the other worm gear, so that the individual components of said composite surfaces may mesh with said other worm gear in the same bodily position of said worm gears.

5. Worm gearing comprising two worm gears conjugate to each other, at least one of said worm gears containing composite tooth surfaces conjugate to the tooth surfaces of the other worm gear, so that the individual components of said composite surfaces may contact with said other worm gear along lines meeting at an angle.

6. Worm gearing, comprising an hour glass worm whose active thread sides are formed by single surfaces and a worm wheel conjugate to said worm and containing composite tooth surfaces, a tooth side of said worm wheel containing two surfaces both suited to mesh with said worm in the same bodily position of said worm and joining each other along an oblique line, said line extending from the tooth top inwardly and laterally.

7. Worm gearing, comprising a worm and a worm wheel conjugate to said worm and containing composite tooth surfaces, a composite tooth surface being composed of a surface having an entirely concave curvature lengthwise of its tooth and of another surface free from concave curvature, the first named surface occupying more than one half of the total tooth surface and both of said surfaces being suited to mesh with said worm in the same bodily position of said worm and worm wheel.

8. Worm gearing, comprising a worm and a worm wheel conjugate to said worm and containing composite tooth surfaces, a composite tooth surface being composed of a surface having an entirely concave curvature lengthwise of its tooth and of another surface free from concave curvature, said surfaces joining each other along a line extending from the tip of the wheel tooth obliquely towards the axis of rotation and towards the tooth end of smaller pressure angle, both of said surfaces being suited to mesh with said worm in the same bodily position of said worm and worm wheel.

9. Worm gearing, comprising a worm and a worm wheel conjugate to said worm and containing composite tooth surfaces, a cylindrical section concentric with said worm wheel and passing through the pitch point showing a composite contour in development, said composite contour containing a concave line and another line free from concave curvature, said concave line occupying at least one half of the total contour and having a finite radius of curvature at each of its points.

10. Worm gearing, comprising a worm and a worm wheel conjugate to said worm and containing composite tooth surfaces, a composite tooth surface containing two surfaces joining each other along a line which extends obliquely from the tip of the gear teeth inwardly and sidewise, the smaller one of said surfaces being free from concave curvature, a cylindrical section concentric with said worm wheel and passing through the pitch point intersecting said surfaces in lines of which one is entirely concave and the other is substantially straight in development.

11. Worm gearing, comprising a worm having a different cross sectional shape in parallel planes perpendicular to its axis and a worm wheel conjugate to said worm, said worm wheel having composite tooth surfaces of such nature as to contact with said worm along lines of pocket form when a considered tooth surface passes through the pitch point, the open side of said pocket facing towards the axis of said worm wheel.

12. Worm gearing, comprising a worm having a different cross sectional shape in parallel planes perpendicular to its axis and a worm wheel conjugate to said worm, said worm wheel having composite tooth surfaces of such nature as to contact with said worm along lines of pocket form, the sides of said pocket meeting at an angle and constituting a V-shape whose open side faces towards the axis of said wheel.

13. Worm gearing, comprising an hour glass worm and a worm wheel conjugate to said worm, said worm wheel having composite tooth surfaces of such nature as to contact with said worm along lines of pocket form, the sides of said pocket meeting at an angle and constituting a V-shape whose open side faces towards the axis of the worm wheel and whose apex coincides with the pitch point in one position of the tooth surfaces.

14. Worm gearing, comprising an hour glass worm and a worm wheel conjugate to said worm and having composite tooth surfaces, a tooth surface consisting of two surfaces meeting along an oblique line, the surface disposed adjacent the tooth end of lower pressure angle being a portion of a helical surface concentric with said wheel.

15. Worm gearing, comprising a worm and a worm wheel conjugate to said worm and containing composite tooth surfaces, a tooth surface of the worm wheel comprising two surfaces meeting in an oblique line and having common tangential planes along said line, the smaller of said surfaces occupying at least one fifth of the total tooth surface and being free from concave curvature.

16. Worm gearing, comprising a worm and a worm wheel conjugate to said worm and containing composite tooth surfaces, one part of a composite tooth surface being a surface of constant profile, such as a helical surface, a plane, a surface of revolution.

17. Worm gearing, comprising a worm and a worm wheel conjugate to said worm and containing composite tooth surfaces, a tooth surface being composed of two surfaces joining each other along an oblique line, the smaller one of said surfaces being a surface of constant profile, such as a helical surface, a plane, a surface of revolution, the other of said surfaces extending outside of the continuation of said smaller surface.

18. Worm gearing, comprising a worm and a worm wheel conjugate to said worm and containing composite tooth surfaces, a cylindrical section concentric with said worm wheel and passing through the pitch point showing a composite contour in development, said contour being composed of a concave portion and of a substantially straight portion meeting said concave portion at the developed pitch point.

19. Worm gearing, comprising an hour glass worm and a worm wheel conjugate to said worm, said worm wheel having composite tooth surfaces which correspond to a composite surface of action, said surface of action intersecting a plane perpendicular to the worm axis and containing the worm wheel axis in a line of pocket form, which line is substantially symmetrical with respect to the shortest connecting line between the axes of said worm and worm wheel.

20. Worm gearing, comprising an hour glass worm and a worm wheel conjugate to said worm, said worm wheel having composite tooth surfaces which correspond to a composite surface of action, said surface of action intersecting a plane perpendicular to the worm axis and containing the wheel axis in a line forming a V-shaped pocket, the open side of said pocket facing towards the root of the wheel teeth.

21. Worm gearing, comprising an hour glass worm and a worm wheel conjugate to said worm and containing composite tooth surfaces, said composite tooth surfaces consisting of two component surfaces so related to the worm that a point of the worm surface has a corresponding point of mesh on one component surface and another corresponding point of mesh on the other component surface.

22. A worm gear having composite tooth sides, one part of a tooth side being a surface composed of straight line elements, the adjacent part extending outside of the continuation of said surface and within the reach of the mating worm gear.

23. A worm gear having composite tooth sides, one part of a tooth side being a surface of constant profile, such as a helical surface, a plane, a surface of revolution, the adjacent part extending outside of the continuation of said one part and joining it along a curved line, said line extending from the tip of the tooth inwardly and laterally.

ERNEST WILDHABER.